(No Model.)
G. H. CLARK.
MACHINE FOR CUTTING TREAD FILLING STRIPS FOR WHEEL TIRES.
No. 601,704. Patented Apr. 5, 1898.
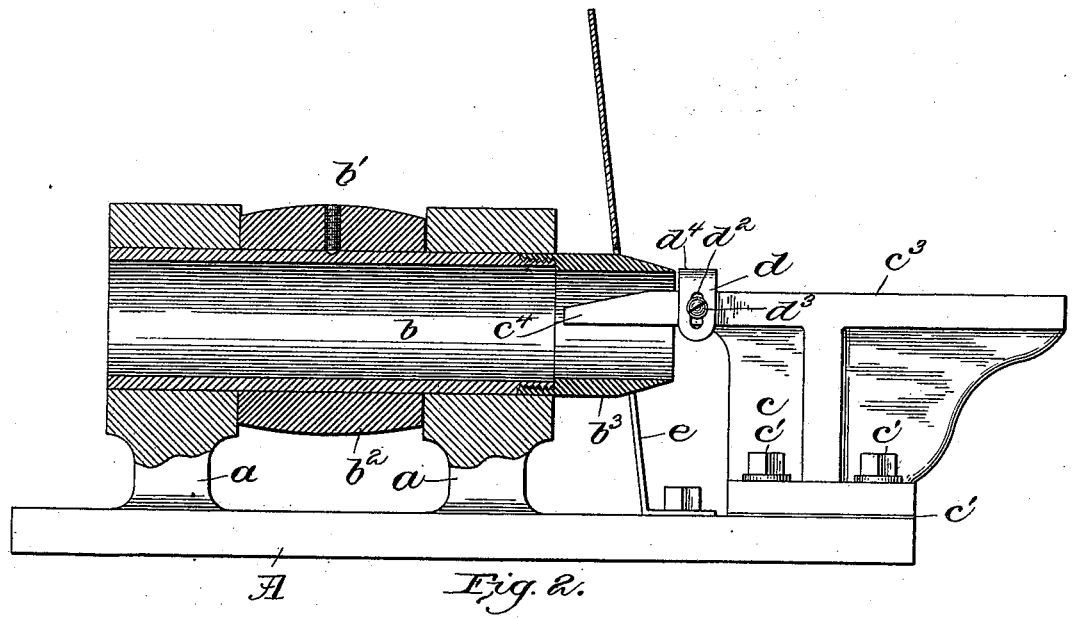
Fig. 2.
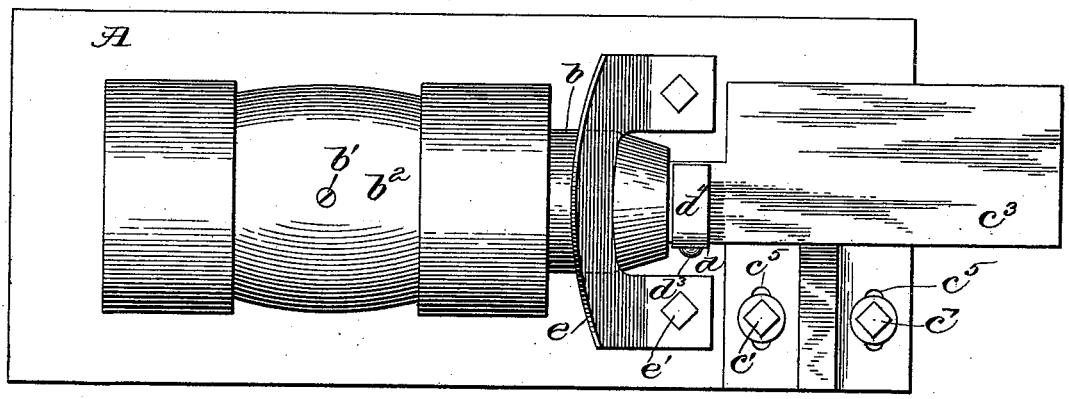
Fig. 1.
Fig. 3.
Fig. 4.
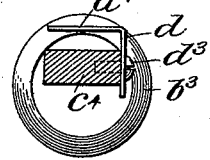
Fig. 5.
Witnesses:
Arthur V. Randall
Mary E. Foster
Inventor:
George H. Clark
by B. J. Hayes
Atty

UNITED STATES PATENT OFFICE.

GEORGE H. CLARK, OF BOSTON, MASSACHUSETTS.

MACHINE FOR CUTTING TREAD-FILLING STRIPS FOR WHEEL-TIRES.

SPECIFICATION forming part of Letters Patent No. 601,704, dated April 5, 1898.

Application filed July 28, 1897. Serial No. 646,222. (No model.)

*To all whom it may concern:*

Be it known that I, GEORGE H. CLARK, of Boston, county of Suffolk, and State of Massachusetts, have invented an Improvement in Machines for Cutting Tread-Filling Strips for Wheel-Tires, of which the following description, in connection with the accompanying drawings, is a specification, like letters on the drawings representing like parts.

In the manufacture of pneumatic wheel-tires it has been found desirable to provide a tread-filling strip between the pneumatic tube and the outer covering at the tread side of the tire, which serves to protect the pneumatic tube, such strip being made of cork, sponge-rubber, or equivalent material and shaped to present in cross-section a curved face at one side and a straight face at the opposite side.

This invention has for its object to construct a machine for cutting strips to be used as tread-filling strips for wheel-tires; and it consists, essentially, of a rotating crown-knife and a work-rest for assisting in presenting the stock to said knife, said work-rest being located in front of said knife and projecting thereinto a short distance and made of a width to closely fit within said knife. The crown-knife may be attached to the end of a hollow shaft, and in such case the strip, after it has been acted upon by the knife, will pass through said shaft. An edge guide is secured to one side of said work-rest, close to the knife, and a top guide is provided which is located above the work-rest and above the knife. The stock to be operated upon is placed upon the work-rest and is fed endwise to the crown-knife and through the hollow shaft, being guided by the edge and top guides and discharged at the opposite end of said shaft.

Figure 1 is a plan view of a machine for cutting tread-filling strips for wheel-tires embodying this invention. Fig. 2 is a side elevation and partial section of the machine shown in Fig. 1. Fig. 3 is a cross-sectional detail of the stock before it has been presented to the crown-knife. Fig. 4 is a similar cross-sectional detail of the tread-filling strip after it has been acted upon by the crown-knife; and Fig. 5 is an end view of the crown-knife, showing the work-rest in section and showing edge and top guides for the stock.

A is the base-plate of the machine, which is formed or provided with uprights $a\ a$, in which is journaled a hollow shaft $b$, and said hollow shaft has fixed thereon, as by means of a set-screw $b'$, a belt-pulley $b^2$, around which a suitable driving-belt may pass, or said shaft may be continuously rotated by any other suitable means.

To one end of the hollow shaft $b$ is secured a crown-knife $b^3$, and for the purpose of conveniently securing the same in place said knife is herein shown as internally screw-threaded at one end and fitted onto an externally-screw-threaded end formed on the hollow shaft $b$.

To the base-plate A and located at one end of the hollow shaft in front of and adjacent to the crown-knife $b^3$ is a work-rest $c$, which is secured in position upon the said base-plate A by means of bolts $c'$ or otherwise. For the purpose of adjusting the work-rest $c$ vertically plates $c^2$ may be interposed between said rest and the plate A, or any other suitable means may be provided for adjusting said rest vertically. The bolts $c'$ project through slots $c^5$, formed in the base of the work-rest, thereby permitting lateral adjustment of said work-rest.

The plate $c^3$ of the work-rest is formed or provided with a narrow nose $c^4$, which is adapted to project a short distance into the crown-knife, and said nose or projection serves to support the stock for a short distance rearwardly of the cutting edge of said knife.

The nose $c^4$ of the work-rest is made of a width to closely fit within the crown-knife, and the said work-rest is adjusted vertically so as to so dispose said nose. By making the nose $c^4$ of such width it will be observed that as the rotating crown-knife cuts the stock which is laid thereon the edges of the strip will be cut clean and the formation of a ragged edge is avoided.

To one side or edge of the top plate $c^3$ of the work-rest is secured an edge guide $d$, which is adjustable vertically, and to provide for such adjustment said guide is herein shown as formed with a slot $d^2$, through which passes a screw $d^3$, which enters a threaded hole formed in the side of the plate $c^3$. The guide $d$ is formed or provided with a laterally-projecting portion $d^4$, which overlies the path of the stock, and said laterally-projecting portion $d^4$ serves as a top guide to prevent upward displacement of the stock and also to assist in guiding the same properly into and through the cutting-blade. The top guide $d^4$ is located just in front of and just above the crown-knife, so as to admit stock of sufficient thickness to enable the crown-knife to cut a smooth curved side for the strip.

The end of the strip of material, such as shown in Fig. 3, is placed under the top guide $d^4$, with one of its edges resting against the edge guide $d$, and said strip is fed forward endwise by hand or otherwise, subjecting it to the action of the crown-knife and also passing it through the hollow shaft.

For the purpose of deflecting the waste portions removed from the upper side of the stock by the crown-knife and to prevent the same from becoming entangled with the operating parts a deflector is provided, which is herein shown as a plate $e$, which embraces the rotating crown-knife $b^3$ and which is secured to the base A by means of bolts $e'$. The deflector $e$ is located a short distance back of the cutting edge of the crown-knife and is arranged in an inclined position.

The cutting edge of the blade may be formed or provided with saw-teeth like unto a trepan, or it may be constructed in any other suitable manner whereby to sever the strip evenly and uniformly.

I claim—

1. In a machine for cutting segmental strips, the combination of a rotating crown-knife, a work-rest in front of and projecting into it a short distance only, and made of a width to closely fit within said knife, an edge guide located in front of and close to said knife, and a top guide for the strip located above the knife, substantially as described.

2. In a machine for cutting segmental strips, the combination of a hollow rotatable shaft having a crown-knife at one end, a work-rest in front of and projecting into said knife a short distance only, and made of a width to closely fit within said knife, an edge guide located in front of and close to said knife having a portion which projects laterally over said work-rest, and which serves as a top guide, and means for adjusting said edge guide whereby said top guide may occupy different elevations above the knife, substantially as described.

3. In a machine for cutting tread-filling strips for wheel-tires, the combination of a rotating crown-knife, and a work-rest in front of and projecting into it, and made of a width to closely fit within said knife, and an adjustable edge and top guide secured to one side of said work-rest close to said knife, substantially as described.

4. In a machine for cutting tread-filling strips for wheel-tires, the combination of a rotating crown-knife, and a work-rest in front of and projecting into it, and made of a width to closely fit within said knife, and an edge and top guide for the strip said top guide located above said work-rest and above the knife, substantially as described.

In testimony whereof I have signed my name to this specification in the presence of two subscribing witnesses.

GEO. H. CLARK.

Witnesses:
B. J. NOYES,
ARTHUR F. RANDALL.